United States Patent

[11] 3,552,628

| [72] | Inventors | Thomas W. Hotchkiss<br>Orange;<br>Richard L. Markus, Bridgeport, Conn. |
|---|---|---|
| [21] | Appl. No. | 821,404 |
| [22] | Filed | May 2, 1969 |
| [45] | Patented | Jan. 5, 1971 |
| [73] | Assignee | Rayrivet, Inc.<br>Bridgeport, Conn.<br>a corporation of Connecticut. by mesne assignments |

[54] FLUID ACTUATED RIVETING APPARATUS
9 Claims, 5 Drawing Figs.
[52] U.S. Cl................................................. 227/51,
227/130
[51] Int. Cl.................................................. B21j 15/10
[50] Field of Search........................................... 227/51-
—62, 82—106, 130

[56] References Cited
UNITED STATES PATENTS

| 2,943,329 | 7/1960 | Spencer........................ | 227/100X |
| 3,346,162 | 10/1967 | De Shong..................... | 227/95 |
| 3,383,754 | 5/1968 | Klenz........................... | 227/130X |

*Primary Examiner*—Granville Y. Custer, Jr.
*Attorney*—Johnson & Kline

ABSTRACT: A machine for upsetting rivets by a reciprocating stroke of a driver in which the driver is hydraulically actuated and its speed during its stroke is varied to decrease the cycle time for the setting of a rivet by having an initial fast movement prior to the driver engaging the rivet, a slow powerful stroke for setting the rivet and a fast return stroke. A piston and cylinder actuate the driver and by their construction control the speed and additionally enable the driver to exert a predetermined force on the rivet before shifting to its return stroke.

3,552,628

INVENTORS
Thomas W. Hotchkiss
Richard L. Markus
BY
Johnson and Kline
ATTORNEYS

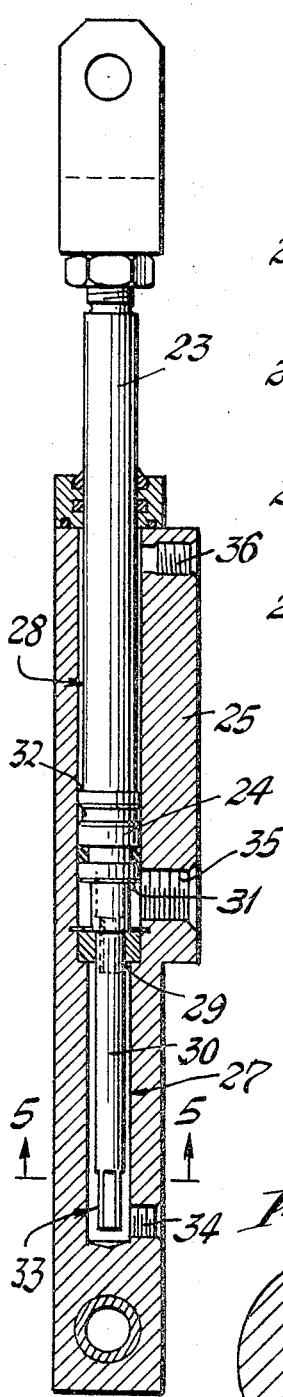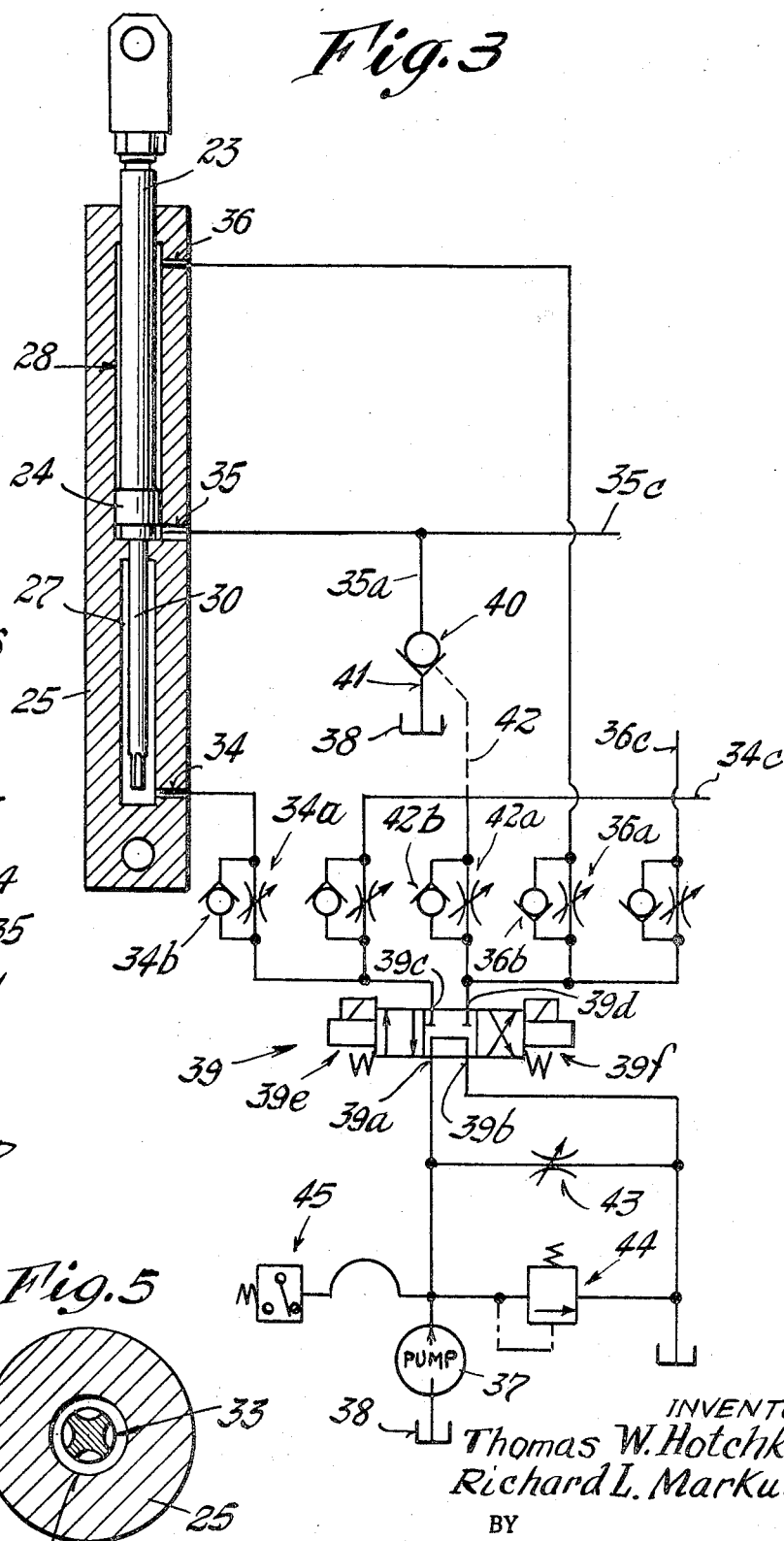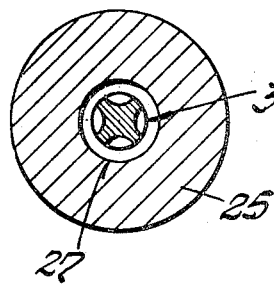

FLUID ACTUATED RIVETING APPARATUS

The present invention relates to a machine that clinches rivets by the use of a single stroke of a driver that compresses the rivet against an anvil with the rivet being shortened by the compression and caused to have at least of its ends spread. While such machines are relatively widely utilized, the driver has generally been actuated by linkage or levers that are connected to an eccentric with the eccentric being driven through a one-revolution clutch. Rivet setting machines are normally manually operated and the cycle time, i.e., the time for setting a rivet of considerable importance because during the cycle time the operator is waiting for the machine to function.

While the cycle time in mechanically actuated machines to move the driver one complete stroke may be easily varied by selection of the various components, when it is desired to actuate such a machine by fluid pressure, it has not heretofore been possible to achieve a small cycle time. This is especially true when the final setting of the rivet requires that the actuator move the driver relatively slowly but yet quite powerfully. Thus, heretofore, known attempts to use fluid pressure actuation have not been completely satisfactory. Moreover, the driver of a mechanically actuated machine will move a set distance before starting its return stroke and in many instances, dimensional differences that occur in the rivets and in the work are such as to prevent the set distance from properly clinching the rivet or destructively overly compressing the rivet and the work.

It is accordingly an object of the present invention to provide an apparatus for setting rivets in which the driver motion is effected by a fluid actuated mechanism and in which the machine has a cycle time comparable to similar mechanically actuated machines but yet has a slow powerful movement for the part of the stroke that sets the rivet.

Another object of the present invention is to provide a rivet setting machine which completes its driving stroke when a predetermined force has been exerted on the rivet instead of after moving a set distance.

A further object of the present invention is to achieve the above objects with a fluid pressure actuator which may be easily substituted for a mechanical actuator in presently existing machines, which is relatively simple in construction and which is reliable and durable in use.

In carrying out the present invention, the rivet setting machine herein described is essentially of the same construction as commercially available mechanically actuated machines and thus includes the same fixed anvil, reciprocating driver and rivet feeding mechanism. While any type of linkage may be employed, such as a toggle, direct connection, etc., to reciprocate the driver, the specific linkage disclosed consists of a pivoted lever. One end of the lever is connected to the driver while the other end is connected to a reciprocating fluid actuated piston rod so that the motion of the piston rod is directly transferred to motion of the driver.

The piston rod s connected to a unitary piston that is operable in a cylinder. One portion of the piston and cylinder provides for fast movement of the piston by having a relatively small diameter bore while a second portion provides for a slow but powerful movement by having a large bore. The flow of fluid under pressure to the cylinder initially causes the one portion to produce the fast movement until a preselected travel has been attained whereupon continued fluid flow operates in the second portion to provide slow speed of movement but a higher actuating force. Thus, for the same quantity of fluid flow, the driver is initially moved fast until it is at the rivet setting position when its speed decreases while it travels the remaining end portion of the stroke with increased force to provide the necessary rivet setting force in a short cycle time.

The shifting of the driver from its rivet setting or down stroke to its return or up stroke is controlled by the resistance that it encounters as it compresses the rivet against the anvil rather than being a fixed movement which is inherent in mechanically actuated rivet setting machines. This is achieved by the use of a fluid pressure actuated switch which determines that the predetermined force is being exerted and then through an electrically operated control valve shifts the fluid pressures in the cylinder. Thus, the present hydraulically actuated riveting machine exerts a precise preselected force on the rivet before starting its return stroke and its shifting to the return stroke is independent of the actual distance moved by the driver which enables the proper clinching of rivets and work having much wider size tolerances than has heretofore been possible with mechanically actuated machines.

Other features and advantages will hereinafter appear.

In the drawing:

FIG. 2 is an enlarged view of the piston and cylinder.

FIG. 3 is a hydraulic schematic and pictorial representation of the hydraulic system as used in the present machine.

FIG. 5 is a section taken on the line 5–5 of FIG. 2.

Figure 1:
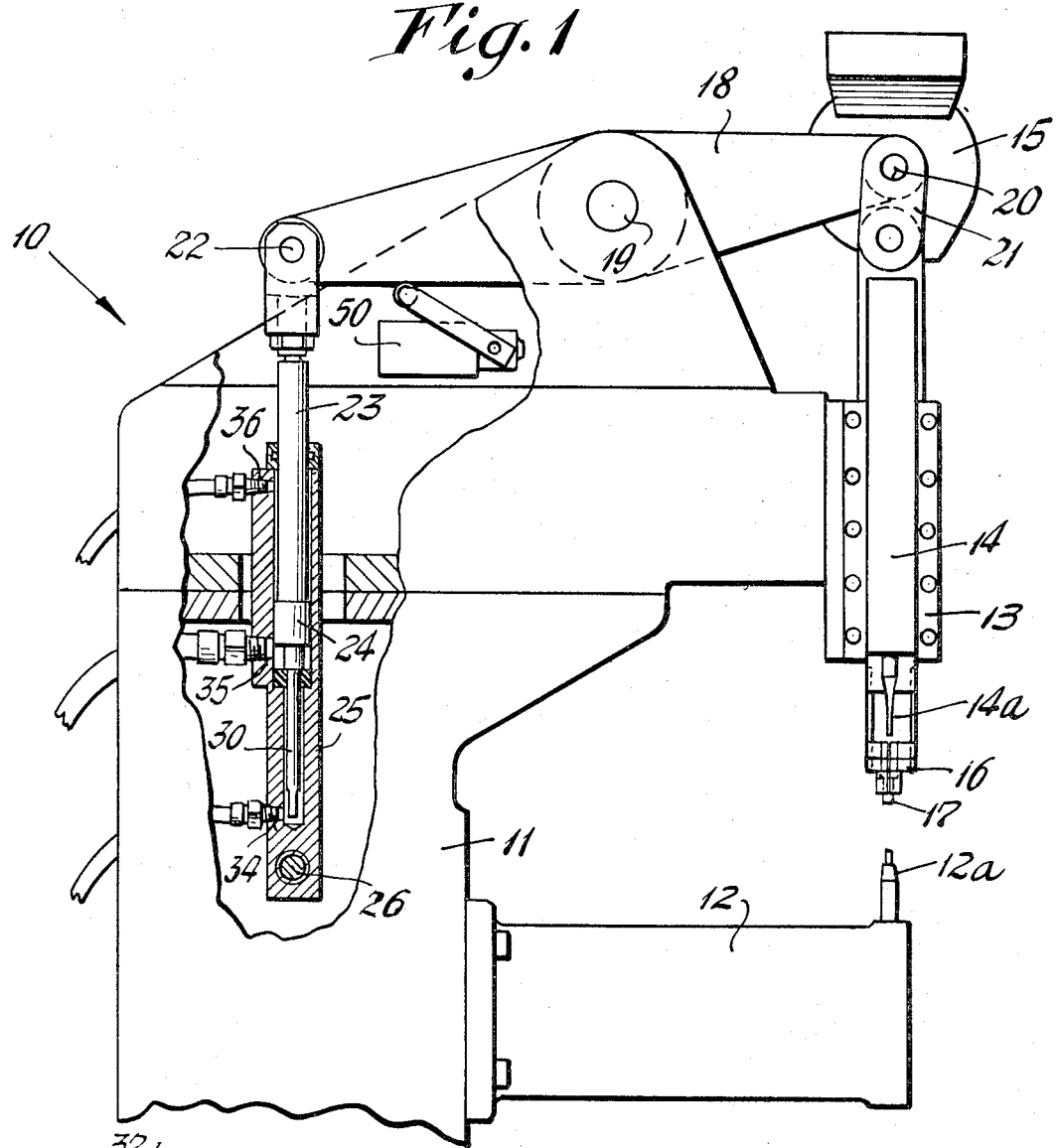
FIG. 1 is a plan, with portions broken away, of a fluid actuated riveting machine in accordance with the present invention.

Referring to the drawing, the fluid actuated riveting machine of the present invention is generally indicated by the reference numeral 10 and includes a base 11 on which is mounted an anvil 12 having a replaceable head 12a. A slideway 13 is mounted opposite the anvil and contains, for reciprocating movement, a driver 14 carrying a driving head 14a. The rivets are automatically fed from a rivet storage and feeding mechanism 15 through a chute (not shown) to rivet holding jaws 16 which, as shown, hold a rivet 17. The base further supports a pivoted lever 18 on a pivot pin 19 with one end of the lever being connected by a pin 20 and link 21 to the driver 14. The other end of the lever 18 is connected by a pin 22 to the end of a piston rod 23.

With the above-recited structure, the pivotal movement of the lever 18 will cause the driver 14 to move with the jaws 16 and rivet 17 toward the anvil 12. The end of the rivet will engage the anvil head 12a and be compressed by continued movement of the driver to have its end spread, thereby clinching the rivet. The work in which the rivet is clinched is normally supported on the head 12a. The driver 14 is returned by a downward movement of the pivot 22 to the position shown, the rivet storage and feeding mechanism will feed through the chute the next rivet to the jaws 16 and the operator may remove the work having the clinched rivet and place the next work onto the anvil. This operation is identical to that of presently existing riveting machines except that the pin 22 is caused to be mechanically actuated as, for example, through an eccentric on a one-revolution clutch.

According to the present invention, a piston rod 23 is connected to a piston 24 that is contained within a cylinder 25 that has one end pivoted as at 26, to the base 11 so that the motion of the piston is directly translated through the pin 22 into corresponding movement of the driver 14. The driver movement is caused to have, by the piston 24, a relatively rapid movement from its retracted position shown until the end of the rivet 17 approximately engages the anvil head 12a, a continued downward movement which is relatively slow but of substantial force for a distance to effect upsetting of the rivet and a fast return stroke to its fully retracted position. This combination of movements enables the riveting machine of the present invention to have a cycle time, i.e., the time to move downwardly, clinch one rivet and move to its normal position, of quite small duration comparable, if not perhaps less then, that os mechanically actuated rivet setting machines.

Referring to FIG. 2, the cylinder 25 has a first bore 27 and a second bore 28 with an aperture 29, permitting communication between the two bores. The piston has a small diameter portion 30, a large exposed surface 31, and opposite the surface 31, a relatively small exposed surface 32. The small diameter portion 30 of the piston is sized to fit the aperture 29 except for its end part 33 which is fluted as shown in FIG. 5. Thus whenever the small diameter portion 30 is positioned in the aperture 29 there is substantially no fluid flow through the aperture but when the fluted end portion 33 is positioned therein a substantial flow of fluid may occur from the first bore 27 through the aperture 29 to the second bore 28.

For introducing fluid into the bore 27, there is provided a first passageway 34 while for introducing fluid into the second bore 28 there is provided a second passageway 35 and a third passageway 36. The passageways are located, as shown, so that the passageway 34 is adjacent the end of the bore 27 that is remote from the aperture 29, the passageway 35 is adjacent the aperture 29 and the passageway 36 is adjacent the end of the second bore 28 from which the piston extends to become the piston rod 23. The position of the piston in the cylinder in FIG. 2 occurs when the driver 14 is in its retracted position.

Shown in FIG. 3 is a hydraulic schematic diagram containing the connections of the passageways 34, 35 and 36. The system includes a pump 37 which pumps fluid such as oil under pressure from a sump 38 to an opening 39a of a three-position, four-way solenoid operated valve 39 having other openings 39b, 39c and 39d. The opening 39c is connected to the first passageway 34 through a flow control valve 34a and a check valve 34b. The opening 39d is connected to a plot check valve 40 which is connected by a line 35a to the second passageway 35, and by a line 41 to the sump 38. The connection between the pilot valve 40 and the opening 39d is indicated by the reference numeral 42 and includes a flow control valve 42a and a check valve 42b. The opening 39d is also connected to the third passageway 36 through a flow control valve 36a and a check valve 36b connected in the manner shown.

Other components of the hydraulic system include a flow control valve 43 connected between the pump output and the sump for regulating fluid flow to the valve 39 and additionally an overpressure switch 44 communicating between the pump output and the sump. The pump output has further connected thereto a pressure operated electrical switch 45 which is responsive to the fluid pressure in the pump output and may be adjusted to be actuated at any selected pressure for reasons which will be hereinafter apparent.

With the system as shown, the valve 39 is in its neutral position in which the passageways 39a and 39b are not connected by the valve to the openings 39c and 39d and occurs when the driver is in its retracted position. The solenoid 39e of the valve effects, when energized, and extension of the piston rod to move the driver toward the anvil and another solenoid 39f effects, when energized, the retraction of the piston and the driver.

Figure 4:
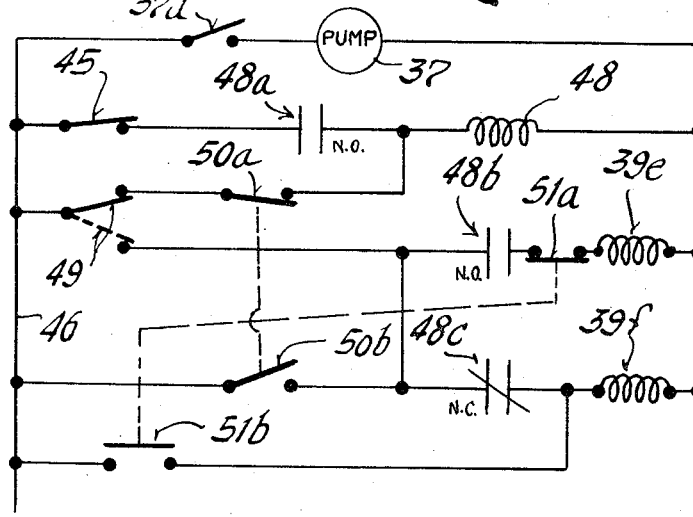
FIG. 4 is an electrical schematic diagram.

Referring to FIG. 4, there is schematically shown, the solenoids 39e and 39f, the pressure switch 45 and the pump 37. The circuit includes a pair of leads 46 and 47 which are connected to a source of electrical energy with the pump 37 being connected thereacross through a pump switch 37a. The pressure switch 45 is normally closed and is connected in series with a relay coil 48 and a normally open contact 48a thereof across the two input leads. A foot actuated switch 49 has a solid line, normal position which connects the lead 46 through a contact arm 50a of a position sensing switch 50 to the relay coil 48 to bypass the contact 48a. The dotted line actuated position of the switch 49 is connected to the piston extending solenoid 39e through a normally open contact 48b of the relay 48 and a switch arm 51a of a normally closed manually operatable switch. The solenoid 39f is connected to be energized through normally closed contacts 48c of the relay 48 and switch arm 50b of switch 50. Additionally, the circuit includes a normally open switch 51b that is complementary to the switch 51a to be actuated therewith and connected as shown.

As shown in FIG. 1, switch 50 is connected to have its arms 50a and 50b actuated at the down position of the lever arm 18 which is the up or retracted position of the driver. The switch arms 51 are shown in their normal position.

With the work being positioned on the anvil head 12a, a rivet 17 in the jaws 16 and the lever 18 in the retracted position, the relay 48 is energized through switch 49, contact arm 50a or through pressure switch 45 and contact 48a. The operator presses the foot switch 49 to its dotted line position which energizes the down solenoid 39e to cause the piston rod to move and actuate the switch 50. The down solenoid 39e is maintained energized by either or both, the foot switch being held at its dotted line position or through the closed contact arm 50b. The driver 14 accordingly moves toward the anvil until the driver encounters a resistive force from the rivet which increases the fluid pressure at the pump outlet to a value which effects operation of pressure switch 45 and causes it to assume an open position which deenergizes the relay 48. Contacts 48b then become open deenergizing the solenoid 39e and contacts 48c will assume their normally closed position energizing the retract solenoid 39f through the contact 50b. The piston will then move into the cylinder and the driver 14 upwardly until the lever 18 effects operation of the switch 50 to open the switch arm 50b to deenergize the retract solenoid 39f. Until the switch arm 50b assumes its dotted line position, the relay cannot be energized by either the pressure switch 45 or the foot switch 49.

The switch 51 provides for energizing the solenoid 39f manually, to retract the driver at any time through contact 51b while contact 51a prevents further energization of the extend solenoid 39e.

Referring to the hydraulic system, FIG. 3, it will be seen that when the extend solenoid coil 39e is energized, the opening 39a is connected to the opening 39c and thence to the passageway 34. Simultaneously, the passageway 36 is connected through the openings 39d and 39b to the sump 38. The pressure in the passageway 34 will act upon the small diameter portion 30 of the piston and for a small flow of fluid will cause the piston rod to move quite rapidly out of the cylinder until the end portion 33 is positioned in the aperture 29. During this movement, passageway 35 is connected through the pilot check valve 40 to the sump 38 permitting fluid to flow into the bore 28 by the suction created therein. The fluted end portion 33 will enable communication between the first and second bores through aperture 29 and fluid will flow into the second bore. As it is larger than the bore 27, the same fluid flow thereinto will produce a slow movement of the piston but yet by reason of the increased large surface 31, there will be provided a relatively high force. The fluid flow through the passageway 34 will continue and the piston will extend to about the dotted line position, i.e., until the pressure switch 45 is actuated by the driver encountering a resistive force which increases the pump outlet pressure to the valve to which the switch 45 is adjusted to be actuated and the portion 33 will be about at the dotted line position. The coil 39e becomes deenergized and the coil 39f energized to connect passageway 34 to the sump through openings 39c and 39b and the pump output opening 39a to opening 39d. The fluid pressure at the opening 39b will be communicated to the passageway 36 and will also be communicated to the pilot check valve 40 through the line 42. This will effect a fluid pressure on the surface 32, which surface is quite small in view of the diameter of the piston rod substantially approaching the diameter of the second bore, and the flow of fluid will cause a rapid movement of the piston rod downwardly with the passageways 35 and 34 draining into the sump. It will be understood that pressure in the line 42 causes the pilot check valve to be open and permit fluid flow therethrough into the sump. Upon the piston attaining the position which causes the lever 18 to actuate the switch 50, the solenoid coil 39f will then become deenergized enabling the valve 39 to assume its shown position wherein there is no communication therethrough and both solenoids are deenergized.

If it is desired to actuate a pair of rivet setting machines simultaneously the passageways of the fluid actuator of the second machine may be connected to branch lines 34c, 35c and 36c through check valves and fluid control valves shown.

It will accordingly be understood that there has been disclosed a rivet setting machine that is fluid actuated but yet has a cycle time that is comparable with heretofore known mechanically actuated machines. This is achieved by the use of a piston and cylinder which have a first and second portion with the former effecting a rapid movement of the piston for a selected fluid flow and the latter effecting a slow but powerful movement for the fluid flow. The powerful movement is relatively short in length but is sufficient to compress the rivet and clinch it in the work. Moreover, the termination of the powerful movement is dependent not on the distance traveled but by the resistive force which is encountered thereby enabling the rivet setting machine to have the force exerted on the rivet by the control over the extent of rivet compression rather than a distance or length being in control.

Variations and modifications may be made within the scope of the invention and portions of the improvements may be used without others.

We claim:

1. A fluid actuated riveting machine comprising a base, means on the base for supporting a driver for reciprocating movement, anvil means aligned with the driver for cooperating therewith to upset a rivet, a fluid actuator having a piston and a cylinder, said cylinder having a first portion having a small bore and a second portion having a larger bore, first fluid inlet means to said first bore and means for providing communication between said first bore and said second bore for enabling fluid flow between said inlet means and said second bore only at a selected position of said piston rod whereby said fluid flow initially moves said piston rapidly outward until the selected position is reached and then moves said piston slowly outwardly with greater force.

2. The invention as defined in claim 1 in which there is a second fluid inlet means connected to said second bore and means connecting said second inlet to a fluid under substantially no pressure for movement of the piston when said piston is moving rapidly outward.

3. The invention as defined in claim 2 in which the means communicating between the first and second bores is an aperture in which the piston has a first portion sized to fit said aperture except for an end portion of reduced size whereby fluid may flow through said aperture when the reduced portion is positioned in the aperture.

4. The invention as defined in claim 3 in which the driver has a rivet setting end portion of its stroke and in which the reduced portion is is located in the aperture during the end portion of the driver stroke.

5. The invention as defined in claim 2 in which there is a third fluid inlet means connected to said second bore, the piston has a second portion substantially approximately the size of the second bore and valve means adapted to connect said third inlet means to a source of fluid pressure and said first and second inlets to a sump for effecting a retraction stroke of said piston.

6. The invention as defined in claim 1 in which there is a source of fluid pressure, in which there are valve means for connecting said first inlet to said source and in which there are means responsive to a selected value of fluid pressure and connected to said valve means for disconnecting the first inlet to the source upon attainment of the selected value.

7. The invention as defined in claim 6 in which there is a second inlet and a third inlet communicating with the second bore, in which the second inlet is adapted to be connected to a supply of fluid under substantially no pressure and in which the valve means also connects said third inlet to said supply when said first inlet is connected to said source.

8. The invention as defined in claim 6 in which there is a second inlet and a third inlet communicating with said second bore, in which the second inlet is connected to a supply of fluid under substantially no pressure and in which the pressure responsive means upon actuation connects said third inlet to said source and said first inlet to said supply to effect a retraction movement of said driver from said anvil.

9. The invention as defined in claim 8 in which the third inlet is maintained connected by the valve means to the source and means for operating said valve to disconnect said third inlet from said source upon the driver attaining a selected retracted position.